US012638703B2

(12) United States Patent
Yen et al.

(10) Patent No.:     US 12,638,703 B2
(45) Date of Patent:         May 26, 2026

(54) SMART CONTACT LENS

(71) Applicant: PEGATRON CORPORATION, Taipei City (TW)

(72) Inventors: Ta-Lung Yen, Taipei City (TW); An-Shyi Liu, Taipei City (TW)

(73) Assignee: PEGATRON CORPORATION, Taipei City (JP)

( * ) Notice: Subject to any disclaimer, the term of this patent is extended or adjusted under 35 U.S.C. 154(b) by 279 days.

(21) Appl. No.: 18/658,402

(22) Filed: May 8, 2024

(65) Prior Publication Data

US 2024/0419019 A1      Dec. 19, 2024

(30) Foreign Application Priority Data

Jun. 15, 2023    (TW) ................................. 112122322

(51) Int. Cl.
*G02C 11/00*          (2006.01)
*G02C 7/04*           (2006.01)
*H01Q 1/27*           (2006.01)

(52) U.S. Cl.
CPC ................ *G02C 11/10* (2013.01); *G02C 7/04* (2013.01); *H01Q 1/273* (2013.01)

(58) Field of Classification Search
CPC .......... G02C 11/10; G02C 7/04; H01Q 1/273; H01Q 5/314; H01Q 5/321; H01Q 5/371; H01Q 7/04; H01Q 1/02; H01Q 13/10; A61B 3/16; H02J 50/12
See application file for complete search history.

(56) References Cited

U.S. PATENT DOCUMENTS 8,857,983 B2 *  10/2014  Pugh ................... H01Q 1/2225
                                                       623/6.22
11,143,885 B2 *  10/2021  Jow ........................ A61B 3/113
2021/0393126 A1    12/2021  Dündar et al.

FOREIGN PATENT DOCUMENTS

TW           201337380        9/2013

* cited by examiner

*Primary Examiner* — Tuyen Tra

(74) *Attorney, Agent, or Firm* — J.C. PATENTS

(57)                ABSTRACT

Disclosed is a smart contact lens including a visible area, an outer ring area, a signal source, an antenna assembly, an induction coil, a high pass filter, an induction module, and a low pass filter. The outer ring area encircles the visible area. The signal source is disposed in the outer ring area. The antenna assembly is disposed in the outer ring area and connected to the signal source. The induction coil is disposed in the outer ring area and encircles the antenna assembly. The high pass filter is connected to the signal source and the induction coil. The induction module is disposed in the outer ring area. The low pass filter is connected to the induction coil and the induction module. The induction coil and the antenna assembly jointly resonate at an ultra-high frequency band, and the ultra-high frequency band is between 902 MHz and 928 MHz.

10 Claims, 4 Drawing Sheets

SMART CONTACT LENS

CROSS-REFERENCE TO RELATED APPLICATION

This application claims the priority benefit of Taiwan application serial no. 112122322, filed on Jun. 15, 2023. The entirety of the above-mentioned patent application is hereby incorporated by reference herein and made a part of this specification.

BACKGROUND

Technical Field

The disclosure relates to a smart contact lens, and in particular to a smart contact lens with induction functions and good antenna performance.

Description of Related Art

The known smart contact lenses include elements such as antennas, chips, induction
modules, and batteries. These elements have to be disposed in a range outside of the visible area. Thus, the space in which these elements can be disposed is limited. If a smart contact lens having the function of detecting intraocular pressure uses an ultra-high frequency antenna, since both the ultra-high frequency antenna and the induction coil for detecting intraocular pressure have a certain area, how to configure the ultra-high frequency antenna and the induction coil in a limited space at the same time and enable the ultra-high frequency antenna with good performance has become a topic requiring discussions in this field.

SUMMARY

The disclosure provides a smart contact lens having an induction function, and an ultra-high frequency antenna of the smart contact lens has a good performance.

A smart contact lens of the disclosure includes a visible area, an outer ring area, a signal source, an antenna assembly, an induction coil, a high pass filter, an induction module, and a low pass filter. The outer ring area encircles the visible area. The signal source is disposed in the outer ring area. The antenna assembly is disposed in the outer ring area and connected to the signal source. The induction coil is disposed in the outer ring area and encircles the antenna assembly. The high pass filter is connected to the signal source and the induction coil. The induction module is disposed in the outer ring area. The low pass filter is connected to the induction coil and the induction module. The induction coil and the antenna assembly jointly resonate at an ultra-high frequency band, and the ultra-high frequency band is between 902 MHz and 928 MHz.

A smart contact lens of the disclosure includes a visible area, an outer ring area, a signal source, an antenna assembly, an induction coil, a first high pass filter and a first switch, a second high pass filter and a second switch, an induction module, and a low pass filter. The outer ring area encircles the visible area. The signal source is disposed in the outer ring area. The antenna assembly is disposed in the outer ring area and connected to the signal source. The induction coil is disposed in the outer ring area and encircles the antenna assembly. The first high pass filter and the first switch connect the signal source to a first position of the induction coil. The second high pass filter and the second switch connect the signal source to a second position of the induction coil. The induction module is disposed in the outer ring area. The low pass filter is connected to the induction coil and the induction module. A part between the first position and a terminal end of the induction coil and the antenna assembly jointly resonate at a first ultra-high frequency band with the first switch being closed and the second switch being open, and a part between the second position and the terminal end of the induction coil and the antenna assembly jointly resonate at a second ultra-high frequency band with the first switch being open and the second switch being closed. The first ultra-high frequency band and the second ultra-high frequency band are between 865 MHz and 928 MHz.

In an embodiment of the disclosure, the antenna assembly includes a first radiator, a second radiator, and a third radiator. The first radiator is connected to the signal source and the second radiator is connected to a ground plane. The third radiator is connected to the first radiator and the second radiator. The first radiator and the second radiator are symmetrically disposed relative to the third radiator.

In an embodiment of the disclosure, the induction coil encircles the first radiator and the second radiator. A slot is formed between the induction coil and the first radiator and between the induction coil and the second radiator.

In an embodiment of the disclosure, the first radiator includes a first segment and a second segment. The first segment is connected to the signal source and closer to the induction coil than the second segment. The second radiator includes a third segment and a fourth segment. The third segment is connected to the ground plane and closer to the induction coil than the fourth segment.

In an embodiment of the disclosure, the high pass filter includes a capacitive element, and the low pass filter includes an inductance element.

Based on the above, the smart contact lens of the disclosure enables the induction coil and the antenna assembly to jointly resonate at an ultra-high frequency band by encircling the antenna assembly with the induction coil. As such, signals of the antenna assembly and the induction module are not affected due to the disposition of the high pass filter and the low pass filter. In this way, the smart contact lens may have an induction function while the antenna has a sufficient radiator area so as to achieve a good antenna performance. In addition, by connecting the high pass filter and the switch to different positions of the induction coil for the smart contact lens, it is possible for the antenna assembly and the induction coil to jointly resonate at ultra-high frequency signals with different frequency bands in order to comply with laws and regulations in different regions.

DESCRIPTION OF THE EMBODIMENTS

Figure 1:
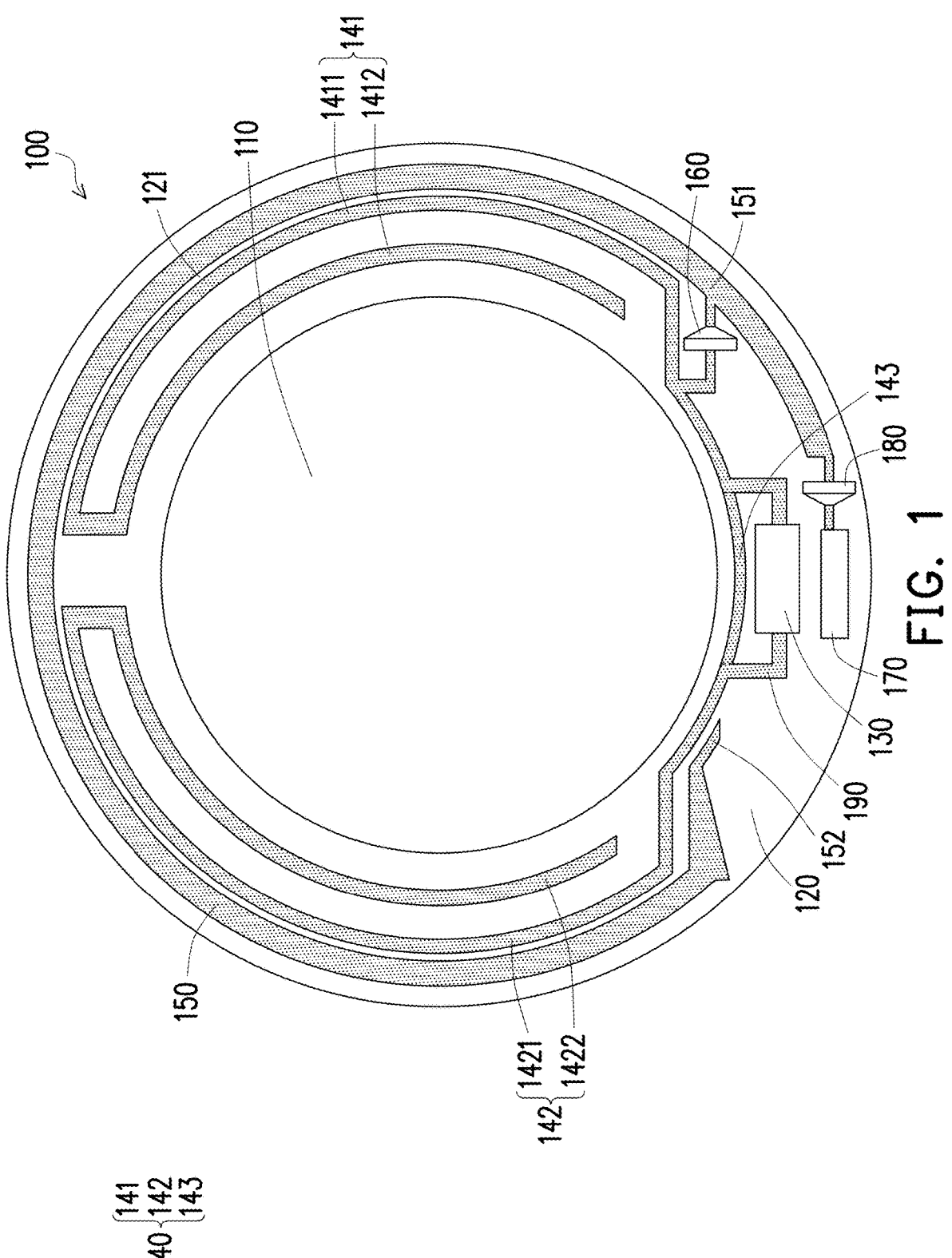
FIG. 1 is a schematic diagram of a smart contact lens according to an embodiment of the
disclosure.
Figure 2:
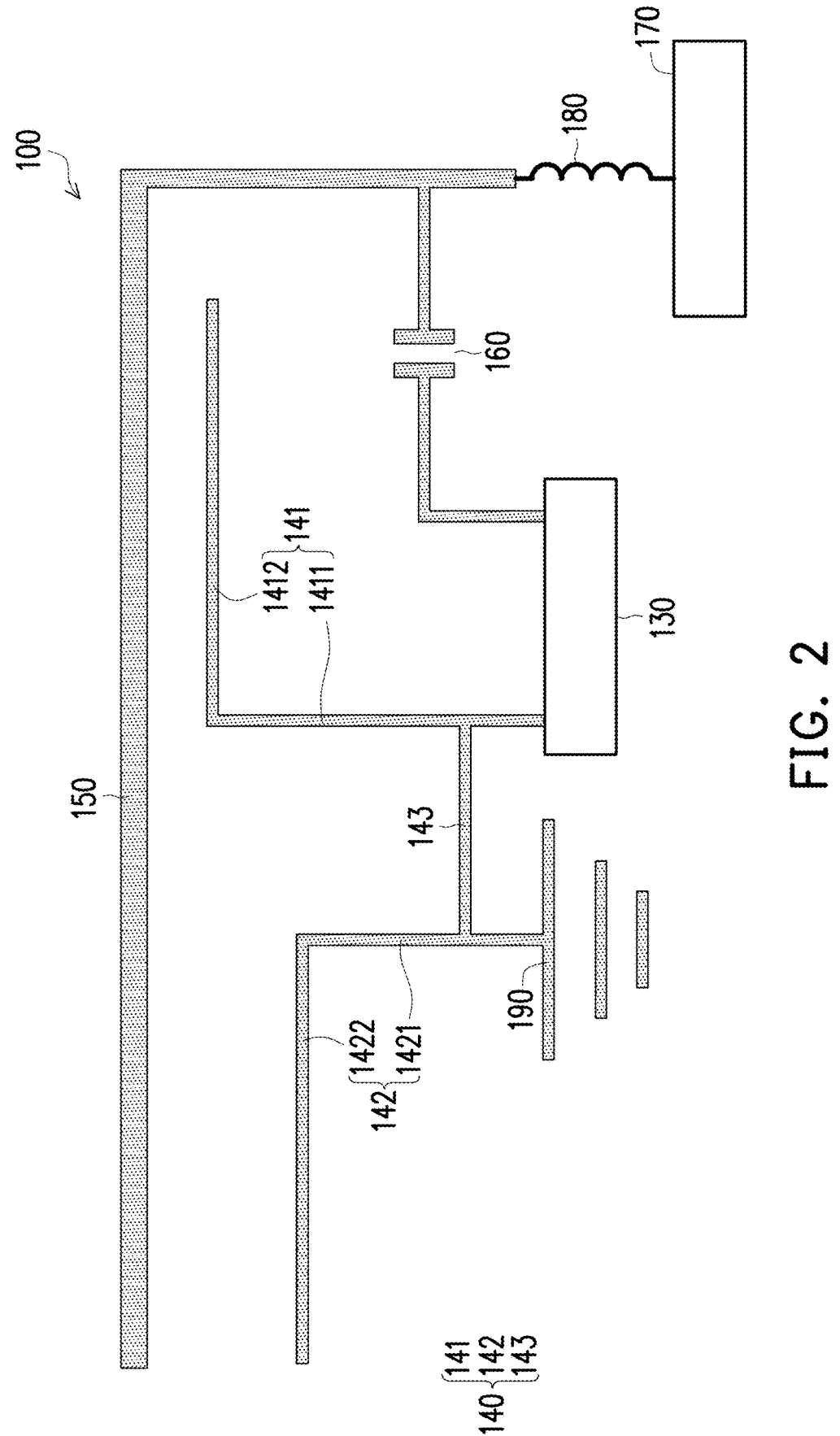
FIG. 2 is a circuit schematic diagram of the smart contact lens in FIG. 1.

FIG. 1 is a schematic diagram of a smart contact lens according to an embodiment of the disclosure. FIG. 2 is a circuit schematic diagram of the smart contact lens in FIG. 1. Referring to FIGS. 1 and 2, a smart contact lens 100 includes a visible area 110, an outer ring area 120, a signal source 130, an antenna assembly 140, an induction coil 150, a high pass filter 160, an induction module 170, and a low pass filter 180. The outer ring area 120 encircles the visible area 110. The signal source 130, the antenna assembly 140, the induction coil 150, the high pass filter 160, the induction module 170, and the low pass filter 180 are disposed in the outer ring area 120. The antenna assembly 140 is connected to the signal source 130. The induction coil 150 encircles the antenna assembly 140. The high pass filter 160 is connected to the signal source 130 and the induction coil 150. The low pass filter 170 is connected to the induction coil 150 and the induction module 170.

In this embodiment, the induction coil 150 and the antenna assembly 140 jointly resonate at an ultra-high frequency band, wherein the ultra-high frequency band is between 902 MHz and 928 MHz.

In this embodiment, the antenna assembly 140 is a dipole antenna, but not limited thereto. In other embodiments, the antenna assembly 140 may be a monopole antenna or a PIFA antenna. In addition, in this embodiment, the high pass filter 160 is a capacitive element and the low pass filter 180 is an inductance element, but not limited thereto.

The antenna assembly 140 includes a first radiator 141, a second radiator 142, and a third radiator 143. The first radiator 141 is connected to the signal source 130, and the second radiator 142 is connected to a ground plane 190. The third radiator 143 is connected to the first radiator 141 and the second radiator 142. The first radiator 141 and the second radiator 142 are symmetrically disposed relative to the third radiator 143.

It is noted that in this embodiment, the first radiator 141 and the second radiator 142 form a dipole antenna. The third radiator 143, which has the function of antenna matching, is connected to the first radiator 141 and the second radiator 142.

The induction coil 150 encircles the first radiator 141 and the second radiator 142. A slot 121 is formed between the induction coil 150 and the first radiator 141 and between the induction coil 150 and the second radiator 142. The induction coil 150 is disposed in parallel with the first radiator 141 and the second radiator 142, enabling the generation of radio frequency signals resonating between the first radiator 141 and the second radiator 142, thereby assisting the first radiator 141 and the second radiator 142 in resonating. Such a design enables the induction coil 150 to maintain the required area and enables the first radiator 141 and the second radiator 142 to have sufficient radiator areas. In this way, the smart contact lens 100 may have an induction function while the antenna assembly 140 has good performance.

On the other hand, the first radiator 141 includes a first segment 1411 and a second segment 1412. The first segment 1411 is connected to the signal source 130 and closer to the induction coil 150 than the second segment 1412. The second radiator 142 includes a third segment 1421 and a fourth segment 1422. The third segment 1421 is connected to the ground plane 190 and closer to the induction coil 150 than the fourth segment 1422.

It is noted that the first segment 1411 and the third segment 1421 close to the signal source 130 have stronger radiant energy compared to the second segment 1412 and the fourth segment 1422. Thus, by placing the first segment 1411 and the third segment 1421 closer to the induction coil 150, a better joint resonating effect may be achieved.

It is worth mentioning that by disposing the high pass filter 160 between the antenna assembly 140 and the induction coil 150, and by disposing the low pass filter 180 between the induction coil 150 and the induction module 170, the smart contact lens 100 enables a low frequency signal generated by the induction coil 150 during intraocular pressure detection to enter the induction module 170 through the low pass filter 180 for data collection. On the other hand, low frequency signals are blocked by the high pass filter 160 to reduce the probability of a low frequency signal entering the antenna assembly 140 and thus causing a short circuit.

Similarly, a high frequency signal generated from the antenna assembly 140 enters the induction coil 150 through the high pass filter 160 so that a part between a position 151 and a terminal end 152 of the induction coil 150 becomes a radiator of the antenna assembly 140, thus giving the antenna assembly 140 a certain radiator area. On the other hand, high frequency signals are blocked by the low pass filter 180 to reduce the probability of a high frequency signal interfering with a signal of the induction module 170. Such a design enables the smart contact lens 100 to have good induction effect and antenna performance.

Figure 3:
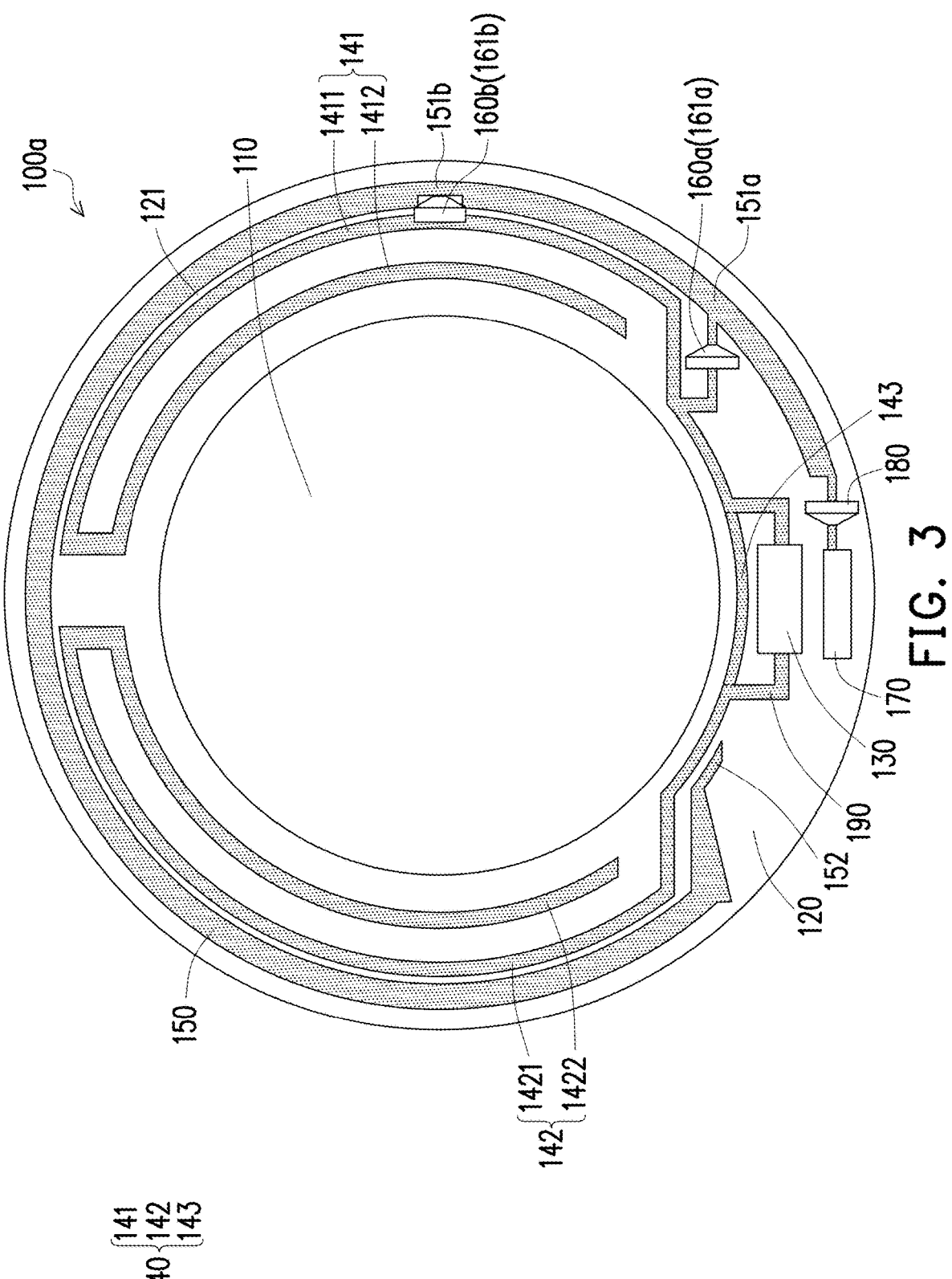
FIG. 3 is a schematic diagram of a smart contact lens according to another embodiment of the disclosure.
Figure 4:
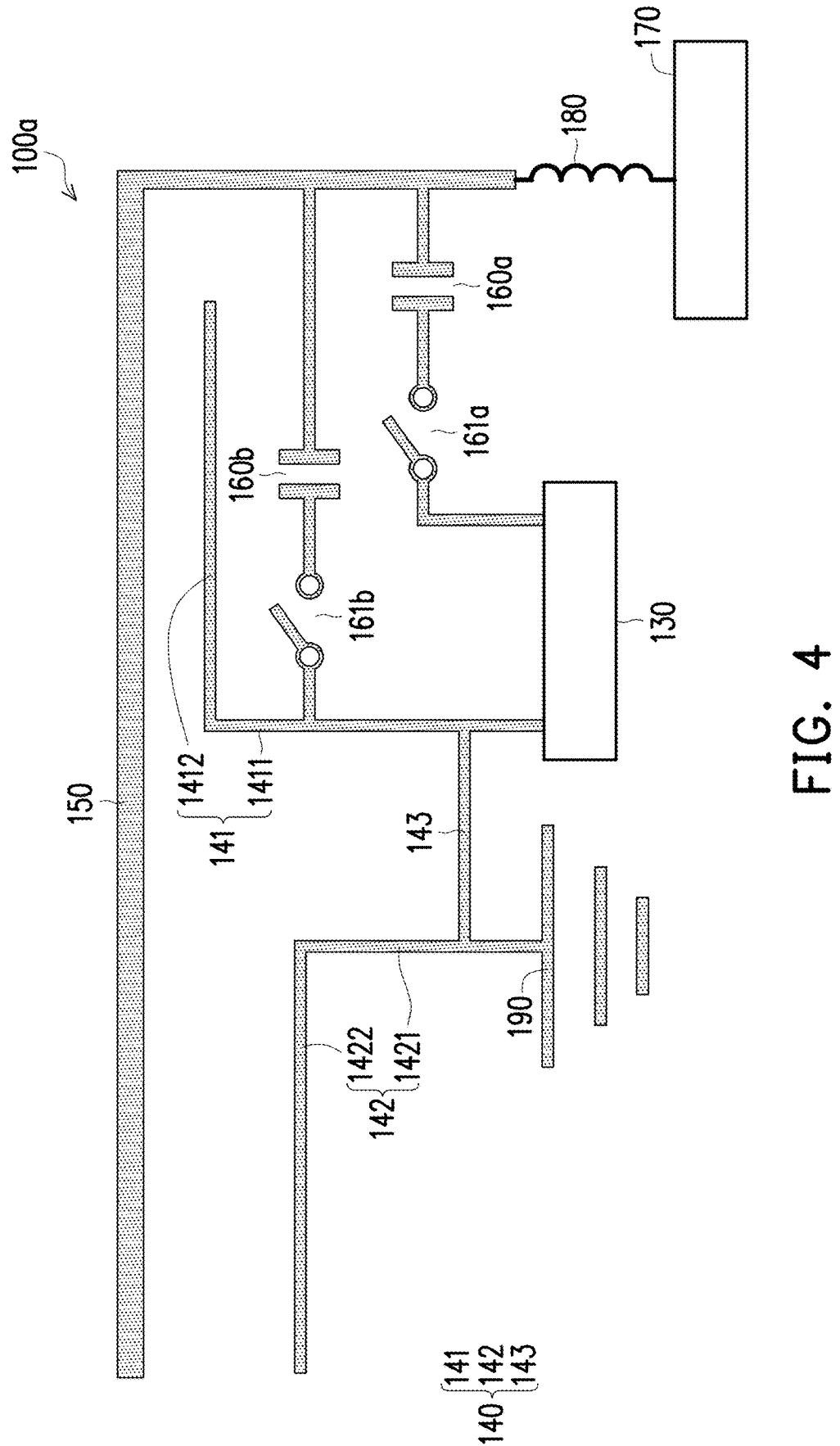
FIG. 4 is a circuit schematic diagram of the smart contact lens in FIG. 3.

FIG. 3 is a schematic diagram of a smart contact lens according to another embodiment of the disclosure. FIG. 4 is a circuit schematic diagram of the smart contact lens in FIG. 3. The main difference between a smart contact lens 100a in FIG. 3 and the smart contact lens 100 in FIG. 1 is that the smart contact lens 100a includes a first high pass filter 160a, a first switch 161a, a second high pass filter 160b, and a second switch 161b between the first radiator 141 and the induction coil 150. A description of the differences are provided below.

The first high pass filter 160a and the first switch 161a connect the signal source 130 to a first position 151a of the induction coil 150. The second high pass filter 160b and the second switch 161b connect to the signal source 130 to a second position 151b of the induction coil 150. A part between the first position 151a and the terminal end 152 of the induction coil 150 and the antenna assembly 140 jointly resonate at a first ultra-high frequency band with the first switch 161a being closed and the second switch 161b being open.

A part between the second position 151b and the terminal end 152 of the induction coil 150 and the antenna assembly 140 jointly resonate at a second ultra-high frequency band with the first switch 161a being open and the second switch 161b being closed, wherein the first ultra-high frequency band and the second ultra-high frequency band are between 865 MHz and 928 MHz.

It is noted that the length of the induction coil 150 affects the range of the ultra-high frequency band generated when the induction coil 150 resonates with the antenna assembly 140. When the induction coil 150 has a longer length, the ultra-high frequency band at which the induction coil 150 and the antenna assembly 140 jointly resonate is lower than an ultra-high frequency band at which a shorter induction coil 150 and the antenna assembly 140 jointly resonate. That is, by adjusting the length of the induction coil 150, the smart contact lens 100a enables the induction coil 150 and the antenna assembly 140 to resonate at different ultra-high frequency bands, thereby complying with laws and regulations in different regions. For example, ultra-high frequency bands are specified at 902 MHz to 928 MHz in the U.S. In Europe, ultra-high frequency bands are specified at 865 MHZ to 868 MHz.

In this embodiment, a resonating length between the induction coil 150 and the antenna assembly 140 is longer with the first switch 161*a* being closed and the second switch 161*b* being open. At this time, an ultra-high frequency band at which the induction coil 150 and the antenna assembly 140 resonate is between 865 MHz and 868 MHz. With the first switch 161*a* being open and the second switch 161*b* being closed, a resonating length between the induction coil 150 and the antenna assembly 140 is shorter. At this time, an ultra-high frequency band at which the induction coil 150 and the antenna assembly 140 resonate is between 902 MHz and 928 MHz.

In summary, the smart contact lens of the disclosure uses joint resonating between the induction coil and the antenna assembly, enabling the antenna assembly to have a sufficient radiator area even when the area of the antenna assembly is smaller. Such a design provides the antenna assembly with good performance. In addition, by disposing the high pass filter between the induction coil and the antenna assembly, and by disposing the low pass filter between the induction coil and the induction module, not only that the probability of a signal of the antenna assembly being affected by a low frequency signal generated by the induction coil is reduced, the probability of a signal of the induction module being affected by a high frequency signal generated by the antenna assembly may also be reduced. On the other hand, by disposing the high pass filter at and connecting the switch to different positions of the induction coil, and by controlling the opened and closed positions between the induction coil and the antenna assembly through the switch, the smart contact lens enables the antenna assembly and the induction coil of different lengths to jointly resonate at ultra-high frequency signals at different frequency bands in order to comply with laws and regulations in different regions.

What is claimed is:

1. A smart contact lens, comprising:
   a visible area;
   an outer ring area, encircling the visible area;
   a signal source, disposed in the outer ring area;
   an antenna assembly, disposed in the outer ring area and
      connected to the signal source;
   an induction coil, disposed in the outer ring area and
      encircling the antenna assembly;
   a high pass filter, connected to the signal source and the
      induction coil;
   an induction module, disposed in the outer ring area; and
   a low pass filter, connected to the induction coil and the
      induction module, wherein
   an ultra-high frequency band at which the induction coil
      and the antenna assembly jointly resonate, wherein the
      ultra-high frequency band is between 902 MHz and 928
      MHz.

2. The smart contact lens of claim 1, wherein the antenna assembly comprises a first radiator, a second radiator, and a third radiator, wherein the first radiator is connected to the signal source and the second radiator is connected to a ground plane, wherein the third radiator is connected to the first radiator and the second radiator, and the first radiator and the second radiator being symmetrically disposed relative to the third radiator.

3. The smart contact lens of claim 2, wherein the induction coil encircles the first radiator and the second radiator, and a slot is formed between the induction coil and the first radiator and between the induction coil and the second radiator.

4. The smart contact lens of claim 2, wherein the first radiator comprises a first segment and a second segment, the first segment being connected to the signal source and closer to the induction coil than the second segment, wherein the second radiator comprises a third segment and a fourth segment, the third segment being connected to the ground plane and closer to the induction coil than the fourth segment.

5. The smart contact lens of claim 1, wherein the high pass filter comprises a capacitive element, and the low pass filter comprises an inductance element.

6. A smart contact lens, comprising:
   a visible area;
   an outer ring area, encircling the visible area;
   a signal source, disposed in the outer ring area;
   an antenna assembly, disposed in the outer ring area and
      connected to the signal source;
   an induction coil, disposed in the outer ring area and
      encircling the antenna assembly;
   a first high pass filter and a first switch, connecting the
      signal source to a first position of the induction coil;
   a second high pass filter and a second switch, connecting
      the signal source to a second position of the induction
      coil;
   an induction module, disposed in the outer ring area; and
   a low pass filter, connected to the induction coil and the
      induction module, wherein a part between the first
      position and a terminal end of the induction coil and the
      antenna assembly jointly resonate at a first ultra-high
      frequency band with the first switch being closed and
      the second switch being open, and
   a part between the second position and the terminal end of
      the induction coil and the antenna assembly jointly
      resonate at a second ultra-high frequency band with the
      first switch being open and the second switch being
      closed, wherein the first ultra-high frequency band and
      the second ultra-high frequency band are between 865
      MHz and 928 MHz.

7. The smart contact lens of claim 6, wherein the antenna assembly comprises a first radiator, a second radiator, and a third radiator, wherein the first radiator is connected to the signal source and the second radiator is connected to a ground plane, wherein the third radiator is connected to the first radiator and the second radiator, and the first radiator and the second radiator being symmetrically disposed relative to the third radiator.

8. The smart contact lens of claim 7, wherein the induction coil encircles the first radiator and the second radiator, and a slot is formed between the induction coil and the first radiator and between the induction coil and the second radiator.

9. The smart contact lens of claim 7, wherein the first radiator comprises a first segment and a second segment, the first segment being connected to the signal source and closer to the induction coil than the second segment, wherein the second radiator comprises a third segment and a fourth segment, the third segment being connected to the ground plane and closer to the induction coil than the fourth segment.

10. The smart contact lens of claim 6, wherein each of the first high pass filter and the second high pass filter comprises a capacitive element, and the low pass filter comprises an inductance element.

* * * * *